R. VANDATTE & B. LAGYE.
APPARATUS FOR REMOVING THE GREASE AND YOLK FROM WOOL.
APPLICATION FILED JAN. 14, 1910.
961,468.
Patented June 14, 1910.
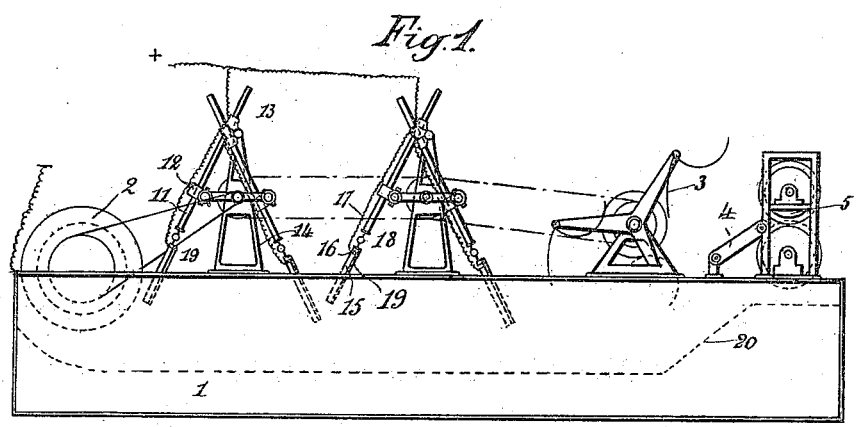
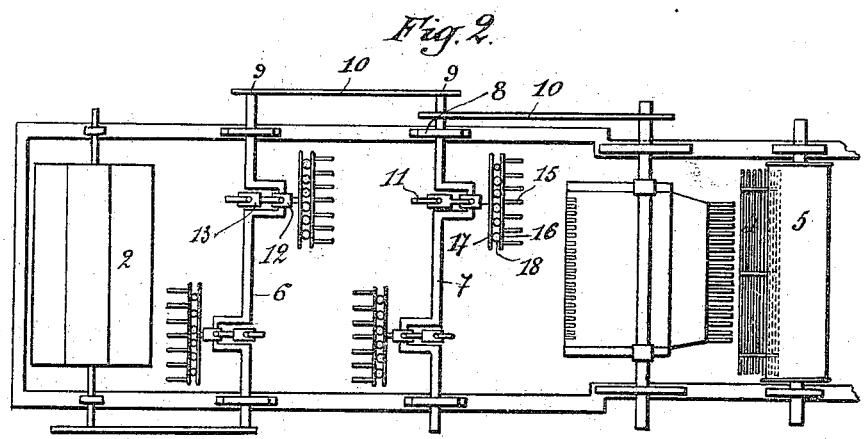
Witnesses
E. Schallinger
R. Goodstein
Inventors
Benoni Lagye
Robert Vandatte
by B. Singer
Att'y

UNITED STATES PATENT OFFICE.

ROBERT VANDATTE AND BENONI LAGYE, OF ANTWERP, BELGIUM.

APPARATUS FOR REMOVING THE GREASE AND YOLK FROM WOOL.

961,468.  Specification of Letters Patent.  Patented June 14, 1910.

Application filed January 14, 1910. Serial No. 538,159.

*To all whom it may concern:*

Be it known that we, ROBERT VANDATTE and BENONI LAGYE, engineers, subjects of the Kingdom of Belgium, residing in 2′ Avenue du Commerce, Antwerp, Belgium, have invented certain new and useful Improvements in Apparatus for Removing the Grease and Yolk from Wool; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved process for removing the yolk and the grease from wool, the wool to be treated being subjected to the action of an electric current while it is moved about in a vat filled with yolk water.

This invention is distinguished from the known systems by the electric current being conducted to the wool under treatment through rakes which, while their supports convey the current to the wool also insure the carrying of the wool along the vat and its subdivision or opening out therein.

In order that our invention may be clearly understood we have hereunto appended explanatory drawings whereon:—

Figure 1 is an elevation of a wool treating vat and apparatus in accordance with this invention. Fig. 2 is a plan view of the same.

On the drawings the same reference numerals wherever repeated indicate the same parts.

The vat 1 has at one of its extremities an apparatus 2 for sinking the wool into the vat and at the other end an elevator 3 is provided for lifting the wool after treatment out of the vat and on to an endless chain 4, which carries it away to the compressing rolls 5. The various parts of the apparatus just described may be of any of the known types suitable for the purpose.

Between the immerser 2 and the elevator 3 there are arranged a number of rakes for carrying the wool along. The cross supports for the teeth of these rakes are electrically insulated from the rest of the installation and they communicate with one of the poles of some source of electricity, the other pole being in communication with the vat. In the example shown in the drawing four rakes are employed to carry the wool along. These rakes are worked by two shafts 6, 7, supported on bearings 8 arranged on the walls of the vat the shafts 6 and 7 being moved by pulleys 9, driven by belts 10, which latter also drive the pulleys for driving the various other parts of the apparatus.

The driving lever 11 of each of the rakes is fixed to a piece 12, traversed by one of the cranks formed by a double bend on the shaft 6 or 7. The rake itself is in each case fixed to the lower part of the lever 11, while the upper side of the latter is guided in a piece 13, which moves around a fixed axis supported by uprights 14 firmly attached to the vat. It will easily be seen that the rotation of the shafts 6 and 7 will have the effect of causing the rakes to penetrate into the liquid in the vat, to move them in that liquid in the one direction and then withdraw them from the liquid and carry them back, in the contrary direction, to the place at which they will again enter the liquid.

In order to effect the electric insulation of the teeth 15 of the rakes, they are fixed to a cross piece 16, which is united to a second cross piece 17, by means of spheres or balls 18 made of some insulating material. The electric wire carrying the current is attached to the cross piece 16, which may be of bronze or other suitable material. The teeth 15 are of wood, covered with lead. To diminish the friction of these teeth against the wool it is advantageous to fix on their front edge a glass rod such as 19 (see Fig. 1).

A perforated false bottom 20 runs over the whole length of the vat 1.

The wool or fleece to be treated is immersed in the vat 1, by the plunger 2, and is then drawn along by the rakes as far as the elevator 3. While the wool is in contact with each of these rakes, it is being traversed by an electric current, which removes the grease and the yolk, without diminishing the length, fineness or strength of the fiber and without affecting in any way the scaly covering of the wool. A partial bleaching is also effected. This result is essentially due to the manner in which these wool is carried along, seeing that these rakes, as they carry along the wool, are constantly teasing or working it and opening it out, thus favoring the removal of impurities, such as earth or sand, etc. These impurities pass through the perforated plate 20 and are collected in the double bottom.

Claims:—

1. An apparatus for cleaning wool comprising in combination, a vat connected with one pole of an electric circuit and provided with a perforated false bottom and adapted to contain a liquid, means for immersing the wool in said vat, means connected with the other pole of said circuit for engaging the immersed wool and advancing the same in said vat, means for elevating the advanced wool, and means located in receiving relation with said elevating means for conveying the elevated wool, substantially as and for the purpose set forth.

2. An apparatus for cleaning wool comprising in combination, a vat adapted to contain a liquid and connected with one pole of an electric circuit, means for immersing the wool in said vat, said vat being connected with one pole of the electric circuit, means connected with the other pole of said circuit for engaging the immersed wool and advancing the same in said vat, and means for elevating the advanced wool from said vat, substantially as and for the purpose set forth.

3. An apparatus for cleaning wool comprising in combination, a vat connected with one pole of an electric circuit, means for immersing the wool in said vat, and means connected with the other pole of said circuit for engaging the immersed wool and advancing the same in said vat.

4. An apparatus for cleaning wool, comprising in combination, a vat connected with one pole of a circuit and adapted to contain a liquid, and means connected with the other pole of said circuit and engaging the wool in said vat to advance the same, substantially as and for the purpose set forth.

5. An apparatus for cleaning wool comprising in combination, a vat connected with one pole of an electric circuit and adapted to contain liquid, and a plurality of devices each connected with the other pole of said circuit for successively engaging and advancing the wool in said vat, substantially as and for the purpose set forth.

6. An apparatus for cleaning wool comprising in combination, a vat connected with one pole of an electric circuit and adapted to contain liquid, and a plurality of devices each connected with another pole of said circuit, and means for intermittently and successively lowering said devices into engagement with the wool and advancing the same in said vat and subsequently withdrawing said devices from the wool, substantially as and for the purpose set forth.

7. An apparatus for cleaning wool comprising in combination, a vat connected with one pole of an electric circuit and adapted to contain a liquid, a plurality of rakes connected with the other pole of said circuit, and means for depressing and raising said rakes successively to engage and advance the wool, substantially as and for the purpose set forth.

8. An apparatus for cleaning wool comprising in combination, a vat connected with one pole of an electric circuit adapted to contain a liquid, a plurality of rakes connected with the other pole of said circuit, and cranks for lowering said rakes into engagement with the wool and advancing the same, substantially as and for the purpose set forth.

In testimony that we claim the foregoing as our invention, we have signed our names in presence of two subscribing witnesses.

ROBERT VANDATTE.
BENONI LAGYE.

Witnesses:
HUBERT MANSION,
EUGENE HENDERICK.